(12) United States Patent
Tan et al.

(10) Patent No.: US 7,800,854 B1
(45) Date of Patent: Sep. 21, 2010

(54) CALIBRATION CIRCUIT FOR VOLTAGE MODE BIASING OF MAGNETORESISTIVE HEADS

(75) Inventors: Kee Hian Tan, Singapore (SG); Kan Li, Singapore (SG)

(73) Assignee: Marvell International Ltd., Hamilton (BM)

( * ) Notice: Subject to any disclaimer, the term of this patent is extended or adjusted under 35 U.S.C. 154(b) by 444 days.

(21) Appl. No.: 11/899,111

(22) Filed: Sep. 4, 2007

Related U.S. Application Data (60) Provisional application No. 60/824,532, filed on Sep. 5, 2006.

(51) Int. Cl.
*G11B 5/03* (2006.01)

(52) U.S. Cl. ...................................................... 360/66

(58) Field of Classification Search .................. 360/66, 360/45, 65; 372/28
See application file for complete search history.

(56) References Cited

U.S. PATENT DOCUMENTS

| | | | | |
|---|---|---|---|---|
| 4,586,184 A | * | 4/1986 | Hess | 372/28 |
| 5,367,411 A | * | 11/1994 | Nishiyama et al. | 360/66 |
| 5,943,177 A | * | 8/1999 | Mathews et al. | 360/65 |
| 5,949,597 A | * | 9/1999 | Pahr | 360/46 |
| 6,366,417 B1 | * | 4/2002 | Mathews et al. | 360/46 |

* cited by examiner

*Primary Examiner*—Fred Tzeng (57) ABSTRACT

A system for calibrating a magneto-resistive (MR) head includes a biasing circuit and a calibration module. The biasing circuit generates a first current to bias a first head during a calibration mode and a calibrated current to bias the MR head during an operating mode. The calibration module calibrates the first current during the calibration mode by adjusting the first current using nonlinear steps to determine the calibrated current.

23 Claims, 10 Drawing Sheets

CALIBRATION CIRCUIT FOR VOLTAGE MODE BIASING OF MAGNETORESISTIVE HEADS

CROSS-REFERENCE TO RELATED APPLICATIONS

This application claims the benefit of U.S. Provisional Application No. 60/824,532, filed on Sep. 5, 2006. The disclosure of the above application is incorporated herein by reference in its entirety.

FIELD

The present disclosure relates to hard disk drives (HDDs) and more particularly to biasing of magneto-resistive (MR) heads in HDDs.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1:
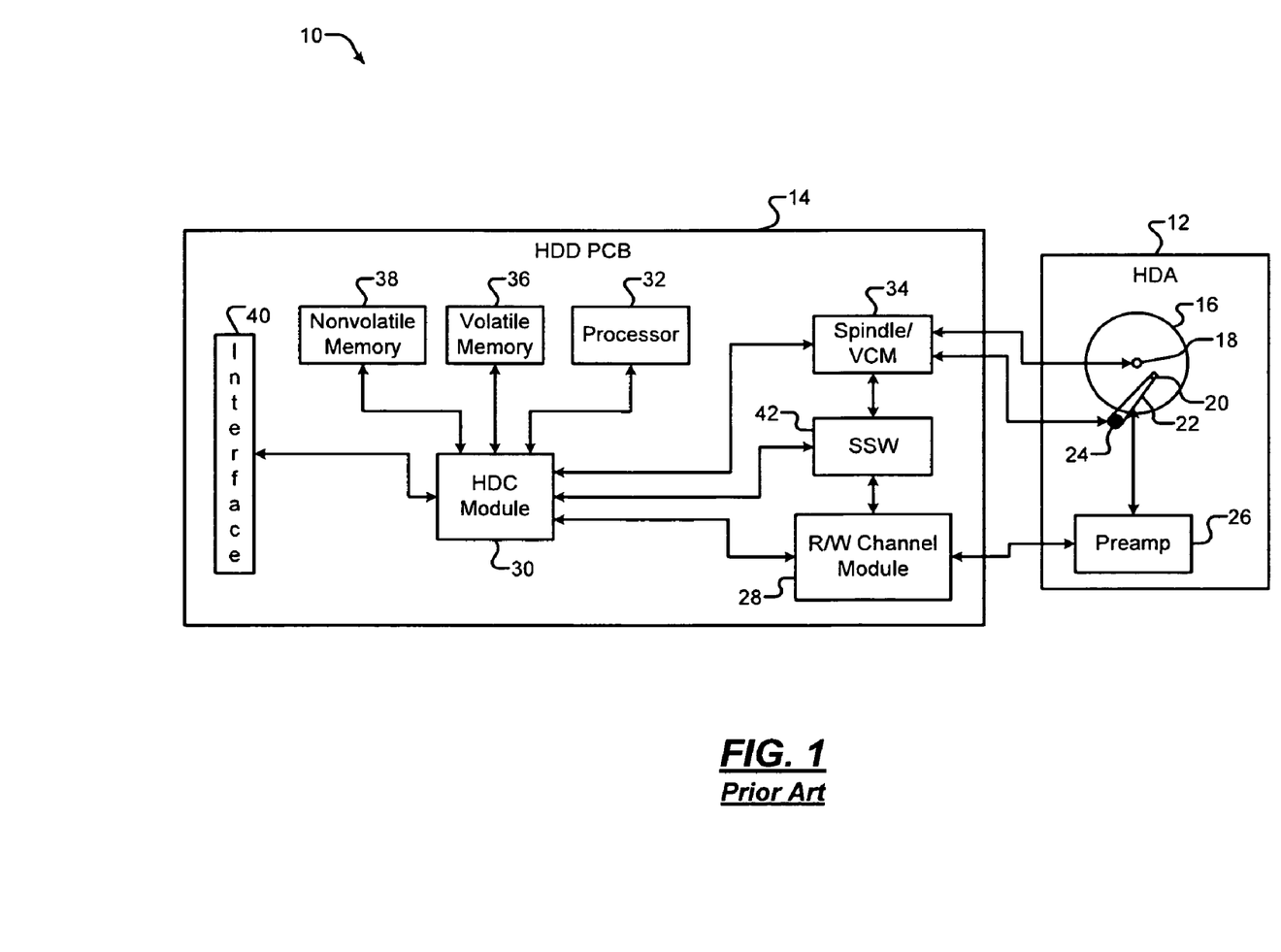
FIG. 1 is a functional block diagram of a hard disk drive according to the prior art.

Referring now to FIG. 1, a hard disk drive (HDD) 10 includes a hard disk assembly (HDA) 12 and a HDD printed circuit board (PCB) 14. The HDA 12 includes one or more circular platters 16, which have magnetic surfaces that are used to store data magnetically. Data is stored in binary form as a magnetic field of either positive or negative polarity. The platters 16 are arranged in a stack, and the stack is rotated by a spindle motor 18. At least one read/write head (hereinafter, "head") 20 reads data from and writes data on the magnetic surfaces of the platters 16.

Each head 20 includes a write element, such as an inductor, that generates a magnetic field and a read element, such as a magneto-resistive (MR) element, that senses the magnetic field on the platter 16. The head 20 is mounted at a distal end of an actuator arm 22. An actuator, such as a voice coil motor (VCM) 24, moves the actuator arm 22 relative to the platters 16.

The HDA 12 includes a preamplifier device 26 that amplifies signals received from and sent to the head 20. When writing data, the preamplifier device 26 generates a write current that flows through the write element of the head 20. The write current is switched to produce a positive or negative magnetic field on the magnetic surfaces of the platters 16. When reading data, the magnetic fields stored on the magnetic surfaces of the platters 16 induce low-level analog signals in the read element of the head 20. The preamplifier device 26 amplifies the low-level analog signals and outputs amplified analog signals to a read/write channel module 28.

The HDD PCB 14 includes the read/write channel module 28, a hard disk controller (HDC) module 30, a processor 32, a spindleNCM driver module 34, volatile memory 36, non-volatile memory 38, and an input/output (I/O) interface 40. During write operations, the read/write channel module 28 may encode the data to increase reliability by using error-correcting codes (ECC) such as run length limited (RLL) code, Reed-Solomon code, etc. The read/write channel module 28 then transmits the encoded data to the preamplifier device 26. During read operations, the read/write channel module 28 receives analog signals from the preamplifier device 26. The read/write channel module 28 converts the analog signals into digital signals, which are decoded to recover the original data.

The HDC module 30 controls operation of the HDD 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device, via the I/O interface 40. The HDC module 30 may receive data to be stored from the external device, and may transmit retrieved data to the external device. The HDC module 30 may use the volatile memory 36 to buffer data.

The processor 32 processes data, which includes encoding, decoding, filtering, and/or formatting the data. Additionally, the processor 32 processes servo or positioning information to position the heads 20 over the platters 16 during read/write operations. Servo, which is stored on the platters 16, ensures that data is written to and read from correct locations on the platters 16. In some implementations, a self-servo write (SSW) module 42 may write servo on the platters 16 using the heads 20 prior to storing data on the HDD 10. The nonvolatile memory 38 may store commands that the processor 32 uses to process the data.

The magneto-resistive read element in the head 20 typically comprises a sensing layer made of MR material. The resistance of the MR material in the sensing layer changes in response to changing magnetic field. The change in resistance enables the MR read element to detect magnetic flux transitions associated with bit patterns (i.e., 1s and 0s) recorded on the magnetic surfaces of the platters 16.

Typically, either current or voltage biasing is employed in the preamplifier device 26 to bias the MR read element for sensing and interpreting the changes in resistance of the MR read element. In current biasing, a predetermined biasing current (e.g., 0.1 to 3 mA) is typically passed through the MR read element to sense the changes in the resistance of the MR read element. Alternatively, in voltage biasing, a predetermined biasing voltage (e.g., 75 to 200 mV) may be applied across the MR read element.

As the MR read element senses the magnetic flux reversals when reading 1s and 0s in bit patterns, the preamplifier device 26 measures change in voltage across the MR read element. The change in voltage is the product of the change in resistance of the MR read element and the bias current passing through the MR read element. The preamplifier device 26 determines the change in the resistance of the MR read element from the change in voltage. Subsequently, the preamplifier device 26 generates a read signal having a voltage proportional to the change in resistance. The voltage of the read signal represents data read by the MR read element.

Accuracy of data read by a MR read element (hereinafter MR head) may be increased by calibrating a bias voltage that is used to bias the MR head. The MR head, however, may be damaged during calibration if the voltage applied to the MR head overshoots, that is, exceeds a maximum voltage that can be applied to the MR head. The maximum voltage that can be applied to the MR head is generally a design parameter assigned by a manufacturer based on the design of the MR head.

Figure 2:
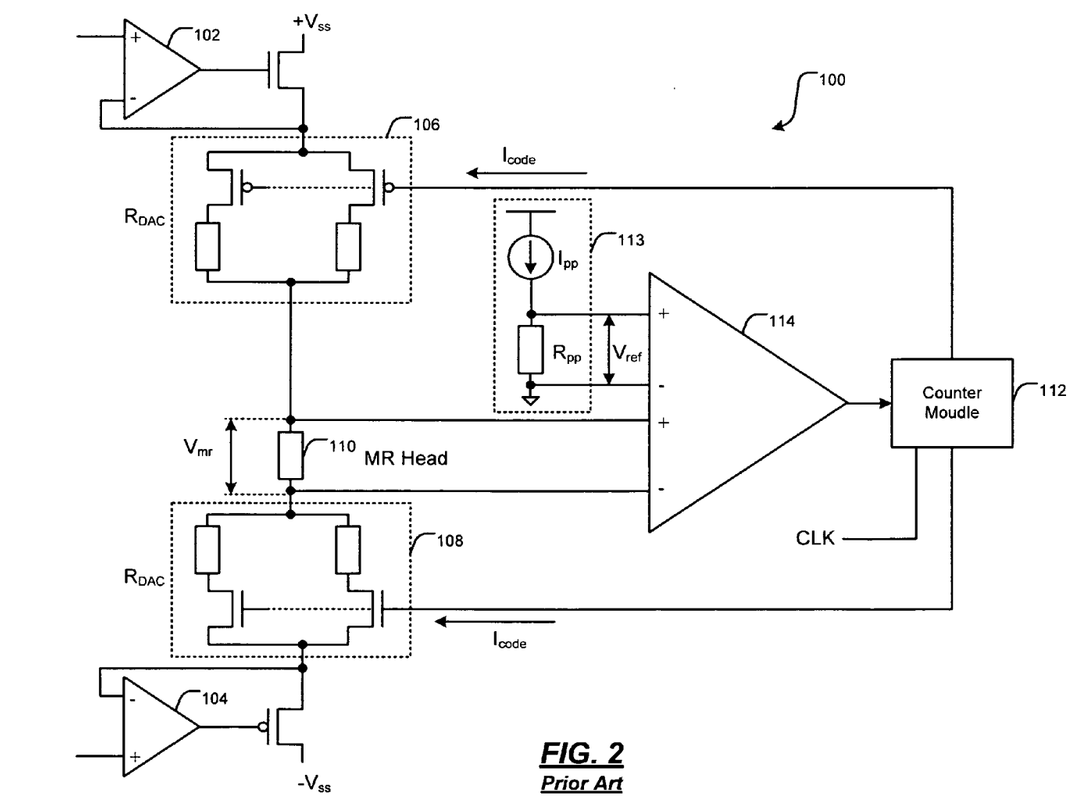
FIG. 2 is a schematic of a system for calibrating a magneto-resistive (MR) read head according to the prior art.

Referring now to FIG. 2, a system 100 for calibrating the bias voltage of the MR head is shown. The system 100 may be implemented in a preamplifier device of a disk drive (not shown). The system 100 comprises voltage regulators 102, 104, digital-to-analog converters (DACs) 106, 108, a MR head 110, a counter module 112, a reference generator 113, and a comparator 114.

The voltage regulators 102, 104 may be linear regulators that output a regulated voltage to the DACs 106, 108. The DACs 106, 108 source current that flows through the MR head 110. The amount of current that flows through the MR head 110 depends on an $I_{code}$ count generated by the counter module 112. Current that flows through the MR head 110 generates a voltage drop $V_{mr}$ across the MR head 110. $V_{mr}$ is input to the comparator 114.

The reference generator 113 generates a reference voltage $V_{ref}$, where $V_{ref}=I_{pp}*R_{pp}$. $V_{ref}$ is approximately equal to a predetermined bias voltage $V_{bias}$ specified by the manufacturer that may be applied to bias the MR head 110 during read operations. $V_{ref}$ is input to the comparator 114. The comparator 114 compares $V_{mr}$ to $V_{ref}$.

When $V_{mr}<V_{ref}$, the counter module 112 increases the $I_{code}$ count. Based on the increased value of $I_{code}$, the DACs 106, 108 increase the current that flows through the MR head 110. The increased current flowing through the MR head 110 increases $V_{mr}$. The comparator 114 compares the increased value of $V_{mr}$ to $V_{ref}$ and indicates to the counter module 112 if $V_{mr} \geq V_{ref}$. The counter module 112 increases the $I_{code}$ count until $V_{mr} \geq V_{ref}$.

Specifically, the counter module 112 increases the $I_{code}$ count from 0000 to 0001, from 0001 to 0010, from 0010 to 0011, etc. until $V_{mr} \geq V_{ref}$. Incrementing the $I_{code}$ count sequentially limits the maximum voltage by which $V_{mr}$ may overshoot to a voltage increase generated by one LSB, which prevents the MR head 110 from being damaged during calibration.

SUMMARY

A system for calibrating a magneto-resistive (MR) head comprises a biasing circuit and a calibration module. The biasing circuit generates a first current to bias a first head during a calibration mode and a calibrated current to bias the MR head during an operating mode. The calibration module calibrates the first current during the calibration mode by adjusting the first current using nonlinear steps to determine the calibrated current.

In another feature, the system further comprises a head selection module that connects the first head to the biasing circuit during the calibration mode and that disconnects the first head from the biasing circuit and connects the MR head to the biasing circuit during the operating mode.

In another feature, when the biasing circuit generates the calibrated current, the head selection module disconnects the first head from the biasing circuit and connects the MR head to the biasing circuit.

In another feature, the first head has a first bias voltage rating that is greater than a second bias voltage rating of the MR head, and the first current generates a first voltage across the first head that is greater than or equal to the second bias voltage rating during the calibration mode.

In another feature, the calibration module comprises a first reference generator, a comparator, and a counter module. The first reference generator generates a first reference voltage. The comparator compares the first reference voltage to a first voltage generated across the first head by the first current and generates a control signal. The counter module generates non-sequential counts based on the control signal, wherein the nonlinear steps are based on the non-sequential counts.

In another feature, the first reference generator comprises a second reference generator and an amplifier. The second reference generator generates a second reference voltage that is substantially equal to a bias voltage rating of the MR head. The amplifier communicates with the MR head during the calibration mode and generates an output based on the second reference voltage and a second voltage across the MR head, wherein the second voltage is generated by a second current that is based on the output.

In another feature, the first reference generator further comprises a current mirror that communicates with the MR head and a second head that matches the first head, wherein the current mirror mirrors the second current and generates a first reference current that generates the first reference voltage across the second head.

In another feature, a preamplifier circuit in a hard disk drive (HDD) comprises the system.

In still other features, a method for calibrating a magneto-resistive (MR) head comprises generating a first current to bias a first head during a calibration mode, adjusting the first current using nonlinear steps to determine a calibrated current, and generating the calibrated current to bias the MR head during an operating mode.

In another feature, the method further comprises connecting the first head to a biasing circuit during the calibration mode, and disconnecting the first head from the biasing circuit and connecting the MR head to the biasing circuit during the operating mode.

In another feature, the method further comprises disconnecting the first head from the biasing circuit and connecting the MR head to the biasing circuit when the biasing circuit generates the calibrated current.

In another feature, the method further comprises generating a first voltage across the first head that is greater than or equal to a bias voltage rating of the MR head during the calibration mode.

In another feature, the method further comprises generating a first reference voltage, generating a control signal based on the first reference voltage and a first voltage generated across the first head by the first current, and generating non-sequential counts based on the control signal, wherein the nonlinear steps are based on the non-sequential counts.

In another feature, the method further comprises generating a second reference voltage that is substantially equal to a bias voltage rating of the MR head, and generating a second current that generates a second voltage across the MR head during the calibration mode, wherein the second current is based on the second reference voltage and the second voltage.

In another feature, the method further comprises generating a first reference current by mirroring the second current, and generating the first reference voltage across a second head based on the first reference current, wherein the second head matches the first head.

In still other features, a system for calibrating a magneto-resistive (MR) head comprises biasing means for generating a first current to bias a first head during a calibration mode and a calibrated current to bias the MR head during an operating mode. The system further comprises calibration means for calibrating the first current during the calibration mode by adjusting the first current using nonlinear steps to determine the calibrated current.

In another feature, the system further comprises head selection means for connecting the first head to the biasing means during the calibration mode and disconnecting the first head from the biasing means and connecting the MR head to the biasing means during the operating mode.

In another feature, when the biasing means generates the calibrated current, the head selection means disconnects the first head from the biasing means and connects the MR head to the biasing means.

In another feature, the first head has a first bias voltage rating that is greater than a second bias voltage rating of the MR head, and the first current generates a first voltage across the first head that is greater than or equal to the second bias voltage rating during the calibration mode.

In another feature, the calibration means comprises first reference generating means for generating a first reference voltage, comparing means for comparing the first reference voltage to a first voltage generated across the first head by the first current and generating a control signal, and counting means for generating non-sequential counts based on the control signal, wherein the nonlinear steps are based on the non-sequential counts.

In another feature, the first reference generating means comprises second reference generating means for generating a second reference voltage that is substantially equal to a bias voltage rating of the MR head, and amplifying means for communicating with the MR head during the calibration mode and generating an output based on the second reference voltage and a second voltage across the MR head, wherein the second voltage is generated by a second current that is based on the output.

In another feature, the first reference generating means further comprises current mirroring means for communicating with the MR head, mirroring the second current, and generating a first reference current that generates the first reference voltage across a second head that matches the first head.

In another feature, a preamplifier circuit in a hard disk drive (HDD) comprises the system.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

To safely calibrate magneto-resistive (MR) heads, the calibration current that passes through the MR heads during calibration is typically increased linearly. Linearly increasing the calibration current, however, slows the calibration process. The present disclosure relates to quickly and safely calibrating MR heads by increasing the calibration current nonlinearly.

Figure 3A:
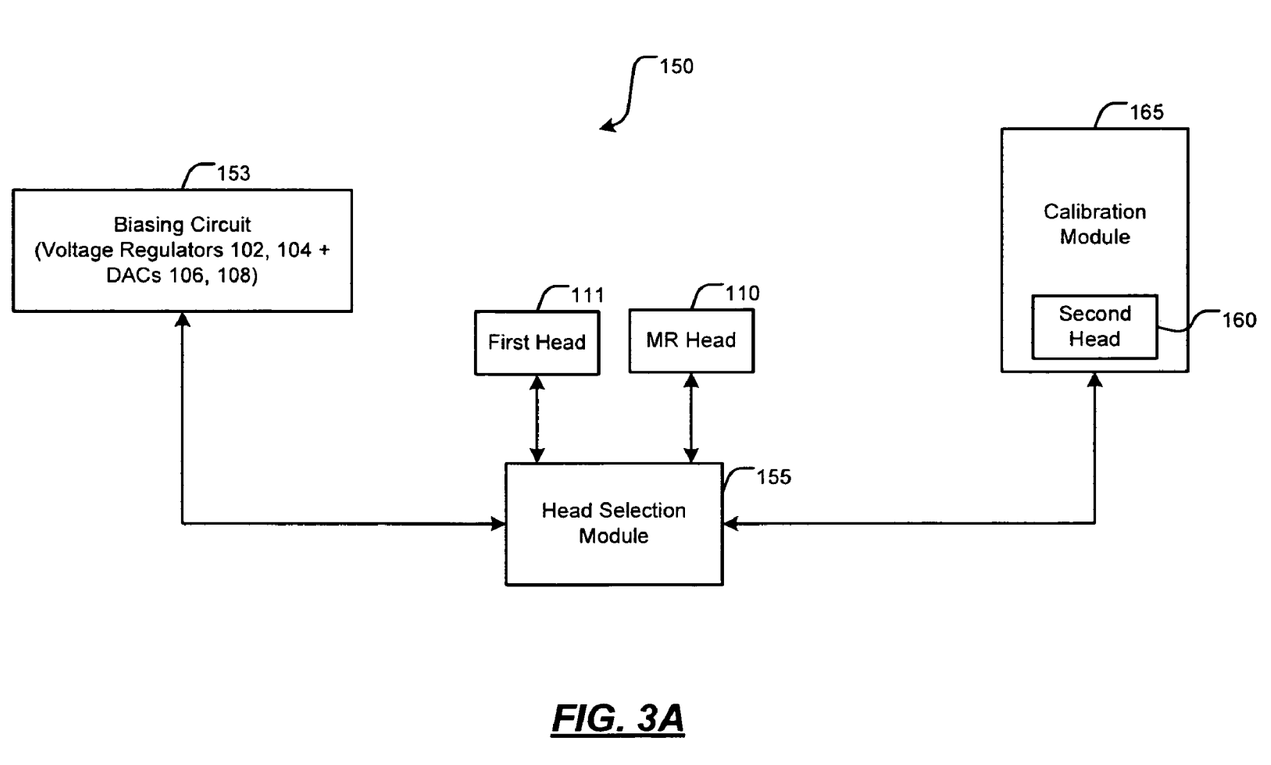
FIG. 3A is a functional block diagram of an exemplary system for calibrating a MR read head (MR head) according to the present disclosure.
Figure 3B:
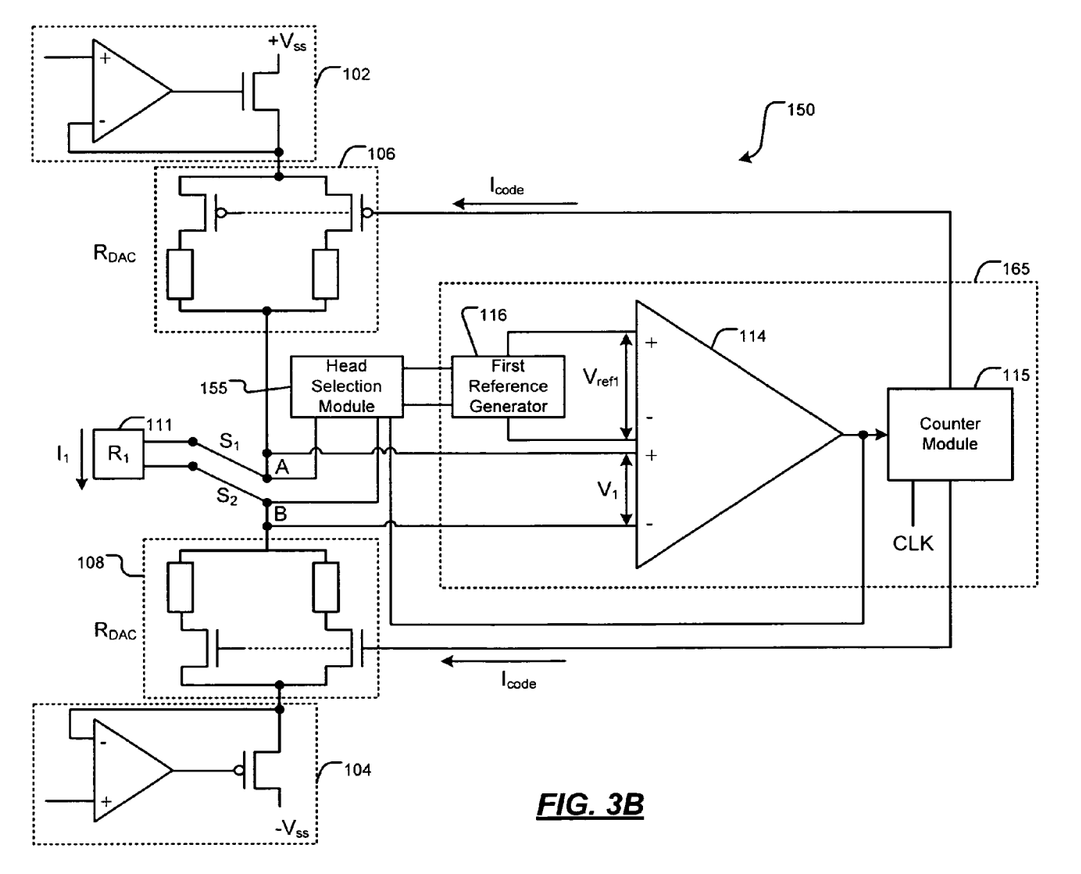
FIG. 3B is a schematic of an exemplary system for calibrating a MR head according to the present disclosure.
Figure 3C:
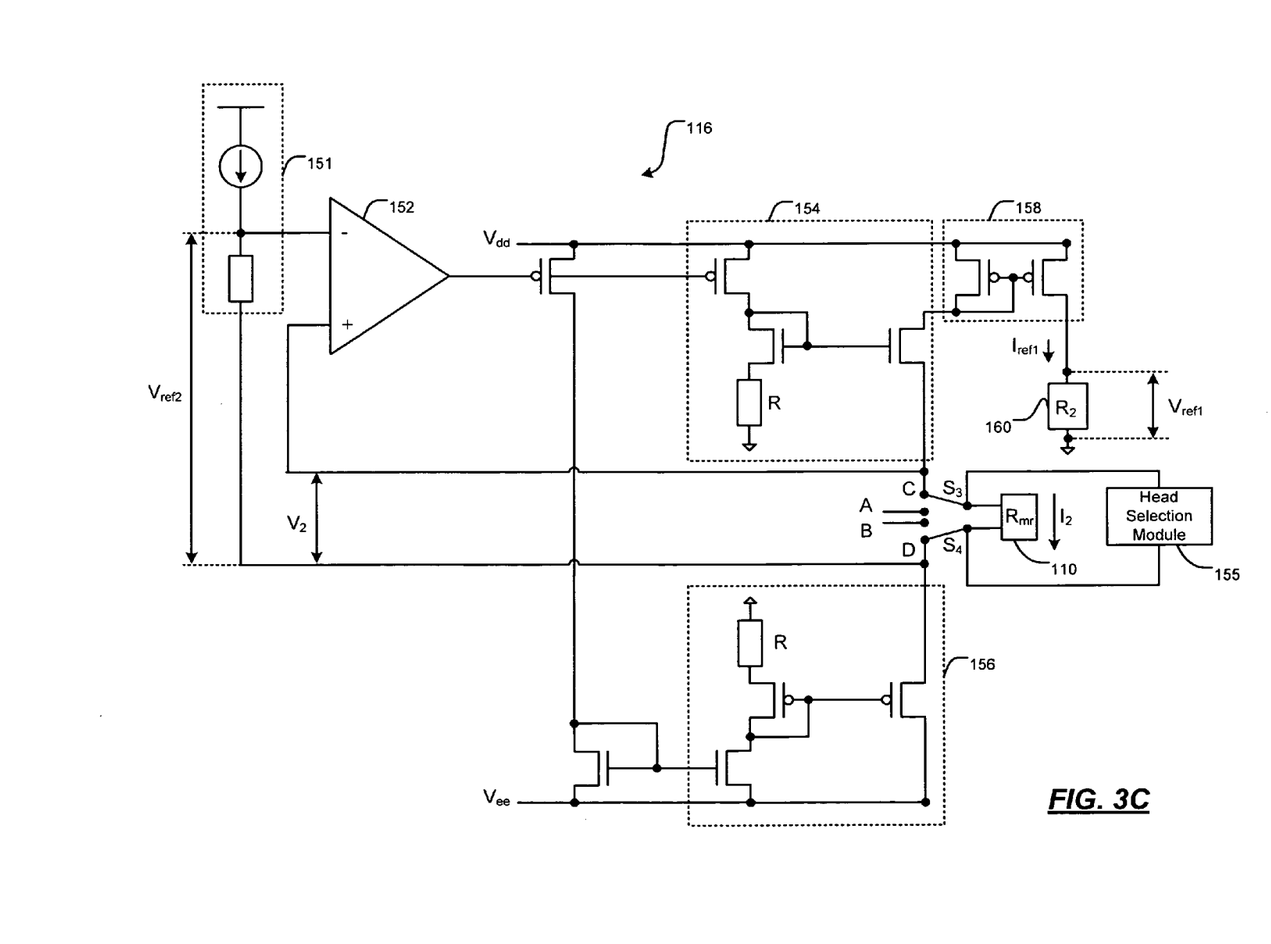
FIG. 3C is a schematic of an exemplary system for generating a calibration reference used by the system of FIG. 3B to calibrate the MR head according to the present disclosure.

Referring now to FIGS. 3A-3C, a system 150 for calibrating the bias voltage of the MR head 110 is shown. FIG. 3A shows a functional block diagram of the system 150. FIGS. 3B and 3C collectively show a detailed schematic of the system 150. The system 150 may be implemented in a preamplifier device of a disk drive (not shown).

First, a brief description of the system 150 follows. In FIG. 3A, the system 150 uses a first head 111 and a second head 160 to calibrate the MR head 110. Specifically, the second head 160 is used to generate a reference voltage $V_{ref1}$ during calibration. The reference voltage $V_{ref1}$ is used to calibrate the first head 111. A current flowing through the first head 111 is increased nonlinearly until the voltage across the first head 111 is equal to the bias voltage $V_{bias}$ of the MR head 110. Thereafter, the first head 111 is disconnected and the MR head is connected in place of the first head 111 during normal operation.

The resistances of first and second heads 111, 160 are approximately equal. Accordingly, the first and second heads 111, 160 are called matched heads 111, 160. Additionally, bias voltage ratings of the matched heads 111, 160 are much greater than the bias voltage $V_{bias}$ of the MR head 110. (The terms bias voltage and bias voltage rating are hereinafter used synonymously.) Accordingly, the current flowing through the first head 111 can be increased nonlinearly although the current may generate voltages across the first head 111 that may exceed $V_{bias}$. Thus, by nonlinearly increasing the current that quickly generates a voltage equal to $V_{bias}$ across the first head 111, the system 150 can quickly and safely calibrate the MR head 110.

The system 150 is now described in more detail. As shown in FIG. 3A, the system 150 comprises a biasing circuit 153, a head selection module 155, the first head 111, the MR head 110, and a calibration module 165 that includes the second head 160. The biasing circuit 153 comprises voltage regulators 102, 104 and digital-to-analog converters (DACs) 106, 108 (shown in FIG. 3B). The head selection module 155 selects the first head 111 and connects the first head 111 to the biasing circuit 153 during calibration. The biasing circuit 153 sources a first current through the first head 111 to generate a first voltage $V_1$ across the first head 111.

Additionally, the head selection module 155 selects the MR head 110 and connects the MR head 110 to the calibration module 165 during calibration. The calibration module 165 sources a second current $I_2$ through the MR head 110. The calibration module 165 mirrors $I_2$ and generates a first reference current $I_{ref1}$. $I_{ref1}$ flows through the second head 160 to generate a first reference voltage $V_{ref1}$ across the second head 160.

The calibration module 165 compares $V_{ref1}$ to $V_1$. The calibration module 165 calibrates the first head 111 by equalizing $I_1$ and $I_{ref1}$. Calibration is complete when $I_1=I_{ref1}$. The value of $I_1$ when $I_1=I_{ref1}$ may be called a calibrated current. Subsequently, the head selection module 155 disconnects the first head 111 from the biasing circuit 153, disconnects the MR head 110 from the calibration module 165, and connects the MR head 110 in place of the first head 111 in the biasing circuit 153. The biasing circuit 153 sources the calibrated current that generates $V_{bias}$ across the MR head 110.

In FIG. 3B, the system 150 comprises voltage regulators 102, 104, digital-to-analog converters (DACs) 106, 108, the first head 111, the head selection module 155, a comparator 114, a counter module 115, and a first reference generator 116. The voltage regulators 102, 104 and the DACs 106, 108 form the biasing circuit 153 shown in FIG. 3A. The comparator 114, the counter module 115, and the first reference generator 116 form the calibration module 165 shown in FIG. 3A.

The voltage regulators 102, 104 may be linear regulators that output regulated voltages to the DACs 106, 108, respectively. The head selection module 155 closes switches S1 and S2 as shown in FIG. 3B and connects the first head 111 to the DACs 106, 108 at points A and B, respectively. The DACs 106, 108 source the first current $I_1$ through the first head 111. $I_1$ generates the first voltage $V_1$ across the first head 111. $V_1$ is input to the comparator 114.

The first reference generator 116 generates the first reference voltage $V_{ref1}$. $V_{ref1}$ is input to the comparator 114. The comparator 114 compares $V_1$ to $V_{ref1}$ and outputs a control signal. The control signal indicates the result of the comparison of $V_1$ and $V_{ref1}$ to the counter module 115. The counter module 115 generates an $I_{code}$ count based on the result of the comparison of $V_1$ and $V_{ref1}$, that is, based on the control signal. The values of $I_1$ and $V_1$ depend on the $I_{code}$ count generated by the counter module 115. The counter module 115 changes the $I_{code}$ count using a binary search algorithm until $V_1=V_{ref1}$. When $V_1=V_{ref1}$, $I_1=I_{ref1}$, and the calibration is complete.

In FIG. 3C, the first reference generator 116 comprises a second reference generator 151, an operational amplifier 152, P and N current sources 154, 156, a current mirror 158, and the second head 160. The first and second heads head 111, 160 are approximately matched. That is, resistance $R_1$ of the first head 111 is approximately equal to resistance $R_2$ of the second head 160.

During calibration, the head selection module 155 connects the MR head 110 to points C and D in the first reference generator 116 using switches S3 and S4 as shown in FIG. 3C. The second reference generator 151 generates a second reference voltage $V_{ref2}$. $V_{ref2}$ is approximately equal to the predetermined bias voltage $V_{bias}$ that may be applied to bias the MR head 110 during read operations. $V_{ref2}$ is input to the operational amplifier 152.

The P and N current sources 154, 156 comprise PMOS and NMOS transistors, respectively, where PMOS denotes positive metal oxide semiconductor and NMOS denotes negative metal oxide semiconductor. The P and N current sources 154, 156 source a second current $I_2$ through the MR head 110. $I_2$ generates a second voltage $V_2$ across the MR head 110. $V_2=I_2*R_{mr}$, where $R_{mr}$ is a resistance of the MR head 110. $V_2$ is input to the operational amplifier 152.

Since an input voltage of the operational amplifier 152 is approximately zero, the operational amplifier 152 equalizes $V_{ref2}$ and $V_2$. Specifically, based on the output of the operational amplifier 152, the P and N current sources 154, 156 source the second current $I_2$ through the MR head 110 so that $V_2=V_{ref2}$. The value of $I_2$ that generates $V_2=V_{ref2}$ may generate the correct bias voltage $V_{bias}$ across the MR head 110. $I_2$ may be determined as follows.

The current mirror 158 mirrors $I_2$ and generates the first reference current $I_{ref1}$. That is, $I_{ref1}=I_2$. Thus, $I_{ref2}=I_2=(V_{ref2}/R_{mr})$. $I_{ref1}$ flows through the second head 160 and generates the first reference voltage $V_{ref1}$ across the second head 160. $V_{ref1}$ is used to perform calibration on the first head 111. $V_{ref1}$ is input to the comparator 114. The comparator 114 compares $V_1$ to $V_{ref1}$. When $V_1=V_{ref1}$, $I_1=I_{ref1}$. That is, $I_1=I_{ref1}=I_2$ when $V_1=V_{ref1}$.

When $V_1$ is not equal to $V_{ref1}$, the counter module 115 changes the $I_{code}$ count. The counter module 115 continues to change the count $I_{code}$ until $I_1=I_{ref1}$. The counter module 115, however, does not change the $I_{code}$ count sequentially. That is, $I_1$ is not changed linearly. Instead, the counter module 115 changes the $I_{code}$ count non-sequentially as follows. Initially, the counter module 115 sets the most significant bit (MSB) of the $I_{code}$ count to a binary 1. For example, the $I_{code}$ count may be initially set to 1000. The value of the $I_{code}$ count determines the values of current $I_1$ and $V_1$.

Subsequently, the comparator 114 determines if $V_1 \geq V_{ref1}$ and generates the control signal. If the control signal indicates that $V_1 \geq V_{ref1}$ the counter module 115 changes the $I_{code}$ count. Specifically, the counter module 115 resets the MSB to a binary 0 and sets the bit adjacent to the MSB (i.e., the next or second MSB) to a binary 1. On the other hand, if $V_1<V_{ref1}$, the MSB remains set to a binary 1, and the second MSB is set to a binary 1. The comparator 114 compares $V_1$ and $V_{ref1}$ again, and the algorithm is repeated until the LSB is reached. Thus, the value of the $I_{code}$ is changed non-sequentially.

Changing the $I_{code}$ count non-sequentially may change the values of $I_1$ and $V_1$ nonlinearly. Thus, changing the value of $I_{code}$ count non-sequentially may generate an excessive value of the first current $I_1$. The excessive value of the first current $I_1$ may generate $V_1$ that is greater than $V_{bias}$, which is an overshoot condition. The overshoot condition, however, may not damage the first head 111 since the bias voltage rating of the first head 111 is much greater than $V_{bias}$.

The counter module 115 continues to change the $I_{code}$ count non-sequentially until the LSB is reached and generates $V_1=V_{ref1}$. Changing the $I_{code}$ count non-sequentially enables the system 150 to quickly arrive at the value of $I_{code}$ (and $I_1$) that generates $V_1=V_{ref1}$. In other words, changing the $I_{code}$ count non-sequentially enables the system 150 to change $I_1$ nonlinearly and thus quickly match $I_1$ to $I_{ref1}$ and $I_2$.

When $V_1=V_{ref1}$, the control signal generated by the comparator 114 indicates that the calibration is complete. The value of $I_1$ that generates $V_1=V_{ref1}$ is called the calibrated current, which may generate correct $V_{bias}$ across the MR head 110 if the MR head is connected to the DACs 106, 108 at points A and B instead of the first head 111.

When the head selection module 155 receives the control signal indicating that the calibration is complete, the head selection module 155 disconnects the first head 111 from points A and B. Additionally, the head selection module 155 disconnects the MR head 110 from points C and D in the first reference generator 116 and connects the MR head 110 to points A and B in the biasing circuit 153 (i.e., to the DACs 106, 108). That is, the head selection module 155 replaces the first head 111 by the MR head 110.

Specifically, the head selection module 155 disconnects the first head 111 from points A and B by opening switches $S_1$ and $S_2$, respectively. Additionally, the head selection module 155 disconnects the MR head 110 from points C and D in the first reference generator 116 by opening switches $S_3$ and $S_4$ and connects the MR head 110 to the DACs 106, 108 by connecting switches $S_3$ and $S_4$ to points A and B, respectively.

Subsequently, the head selection module 155 disables the first reference generator 116. The first current $I_1$ that generated $V_1=V_{ref1}$ (i.e., the calibrated current) now flows through the MR head 110 and generates the correct bias voltage $V_{bias}$ across the MR head 110. The MR head 110 is now calibrated and ready to correctly read data during normal operation.

Since the first and second heads 111, 160 are matched, $R_1$ may be approximately equal to $R_2$. Additionally, the first and second heads 111, 160 may be selected such that $R_1$ and $R_2$ may be approximately equal to $R_{mr}$. Typically, $R_{mr}$ may be small compared to the resistance $R_{DAC}$ of the DACs 106, 108. That is $R_{mr} \ll R_{DAC}$. Thus, $I_1 = I_{rem} = I_2$ when $V_1 = V_{ref1}$. Consequently, after the head select module 155 disconnects the first head 111 and connects the MR head 110 to the DACs 106, 108, the bias voltage $V_{bias}$ across the MR head 110 may be approximately given by the equation $V_{bias} = V_{ref1}$.

After the head select module 155 disconnects the first head 111 and connects the MR head 110 to the DACs 106, 108, the first current $I_1$ may change slightly if $R_1$ and $R_{mr}$ differ due to a slight mismatch between the first head 111 and the MR head 110. The change in $I_1$, however, may be minimized by selecting the first and second heads 111, 160 having resistances nearly equal to $R_{mr}$. $R_{mr}$ may be approximately calculated as a ratio ($V_{ref1}/I_{re}$). Skilled artisans can appreciate that the bias voltage $V_{mr}$ across the MR head 110 may differ only insignificantly from $V_1$ when $R_1$ is approximately equal to the ratio ($V_{ref1}/I_{ref1}$).

Figure 4A:
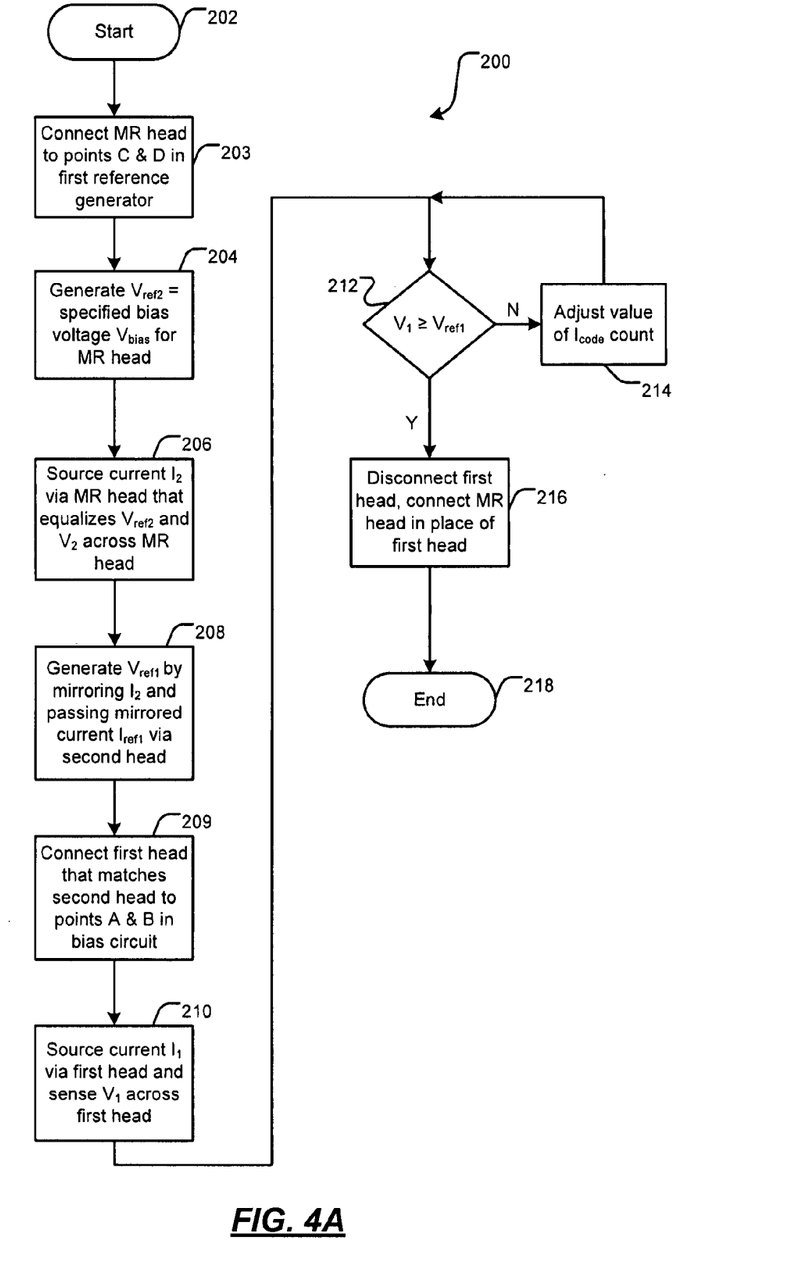
FIG. 4A is a flowchart of an exemplary method for calibrating a MR head according to the present disclosure.
Figure 4B:
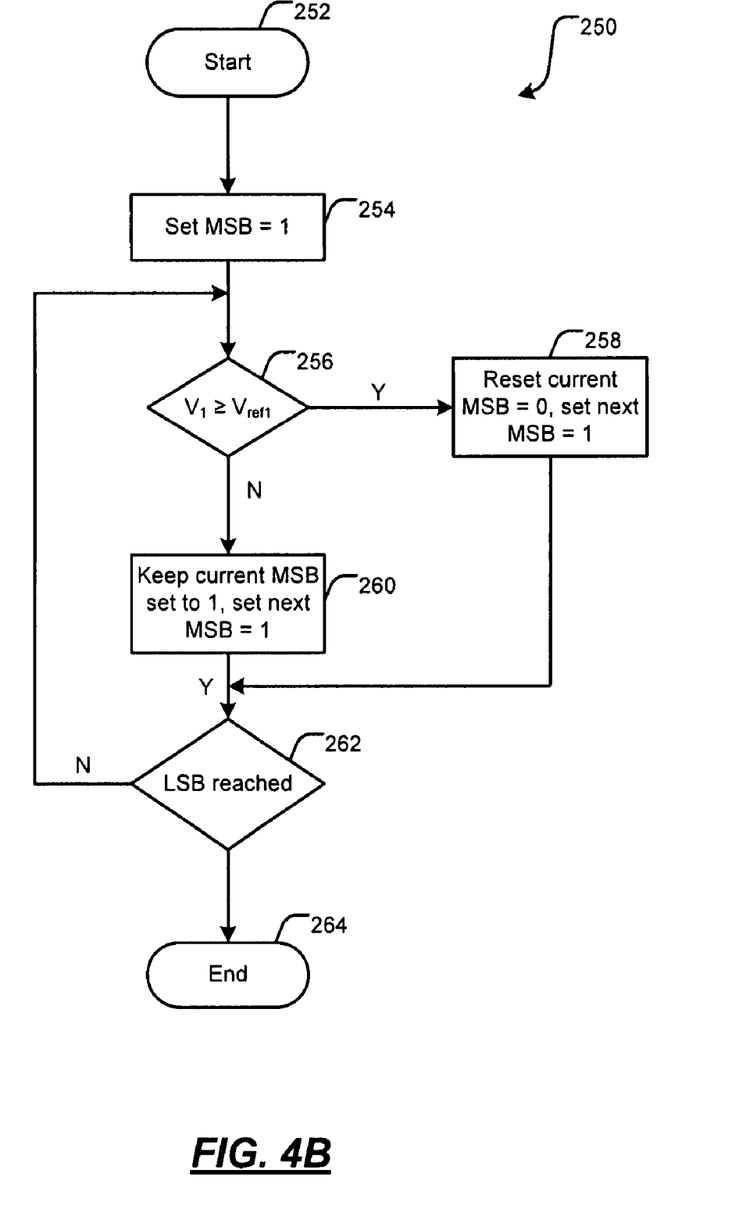
FIG. 4B is a flowchart of an exemplary method for generating a count used by the method of FIG. 4A to calibrate the MR head according to the present disclosure.

Referring now to FIGS. 4A and 4B, a method 200 for calibrating a MR head 110 is shown. FIG. 4A shows a flowchart for the method 200. FIG. 4B shows a flowchart for a method 250 for generating the $I_{code}$ count that is used in the method 200. In FIG. 4A, the method 200 begins at step 202. In step 203, the head selection module 155 connects the MR head 110 to points C and D in the first reference generator 116 during calibration. In step 204, the second reference generator 151 generates the second reference voltage $V_{ref2}$ that is approximately equal to the predetermined bias voltage $V_{bias}$ specified by a manufacturer for the MR head 110.

In step 206, P and N current sources 154, 156 in the first reference generator 116 source the second current $I_2$ through the MR head 110 that generates the second voltage $V_2$ across the MR head 110, and the operational amplifier 152 equalizes $V_{ref2}$ and $V_2$. In step 208, the current mirror 158 in the first reference generator 116 mirrors the second current $I_2$ and generates the first reference current $I_{ref1}$ that passes through the second head 160 in the first reference generator 116 and generates the first reference voltage $V_{ref1}$.

In step 209, the head selection module 155 connects the first head 111 that matches the second head 160 to points A and B to the DACs 106, 108 in the biasing circuit 153 during calibration. In step 210, the DACs 106, 108 source the first current $I_1$ through the first head 111, and the comparator 114 senses the voltage drop $V_1$ generated by current $I_1$ across the first head 111.

The comparator 114 compares $V_1$ to $V_{ref1}$ and determines if $V_1 = V_{ref1}$ in step 212. If not, the counter module 115 generates an $I_{code}$ count in step 214 that changes the values of $I_1$ and $V_1$. Steps 212 and 214 are repeated until the LSB is reached. Thereafter, the head selection module 155 disconnects the first head 111 from points A and B, disconnects the MR head 110 from points C and D, and connects the MR head 110 to points A and B in step 216. The method 200 ends in step 218.

In FIG. 4B, the method 250 for adjusting the $I_{code}$ count, which is referenced in step 214 of method 200, begins at step 252. The counter module 115 sets the most significant bit (MSB) of the value of $I_{code}$ to a binary 1 to change values of $I_1$ and $V_1$ in step 254. For example, if the $I_{code}$ is a 4-bit number, $I_{code}$ is initially set to 1000. The comparator 114 compares $V_1$ to $V_{ref1}$ and determines if $V_1 \geq V_{ref1}$ in step 256. If true, the counter module 115 resets the MSB to a binary 0 and sets the next MSB to a binary 1 (e.g., $I_{code}$ is changed from 1000 to 0100) in step 258. If false, the MSB remains set to a binary 1, and the counter module 115 sets the next MSB to a binary 1 (e.g., $I_{code}$ is changed from 1000 to 1100) in step 260. The counter module 115 determines in step 262 if the LSB is reached. If false, steps 256 through 262 are repeated. If true, the method 250 ends in step 264.

Figure 5A:
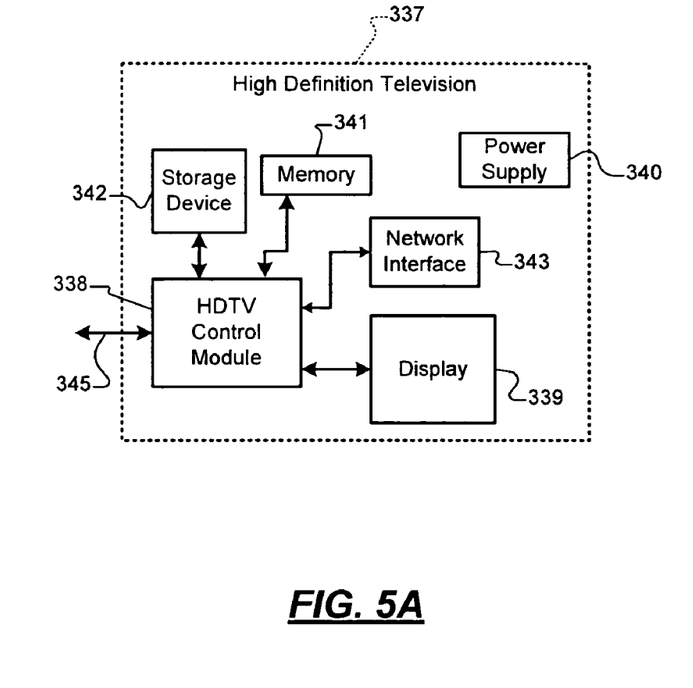
FIG. 5A is a functional block diagram of a high definition television.

Referring now to FIGS. 5A-5E, various exemplary implementations incorporating the teachings of the present disclosure are shown. Referring now to FIG. 5A, the teachings of the disclosure can be implemented in a storage device 342 of a high definition television (HDTV) 337. The HDTV 337 includes a HDTV control module 338, a display 339, a power supply 340, memory 341, the storage device 342, a network interface 343, and an external interface 345. If the network interface 343 includes a wireless local area network interface, an antenna (not shown) may be included.

The HDTV 337 can receive input signals from the network interface 343 and/or the external interface 345, which can send and receive data via cable, broadband Internet, and/or satellite. The HDTV control module 338 may process the input signals, including encoding, decoding, filtering, and/or formatting, and generate output signals. The output signals may be communicated to one or more of the display 339, memory 341, the storage device 342, the network interface 343, and the external interface 345.

Memory 341 may include random access memory (RAM) and/or nonvolatile memory such as flash memory, phase change memory, or multi-state memory, in which each memory cell has more than two states. The storage device 342 may include an optical storage drive, such as a DVD drive, and/or a hard disk drive (HDD). The HDTV control module 338 communicates externally via the network interface 343 and/or the external interface 345. The power supply 340 provides power to the components of the HDTV 337.

Figure 5B:
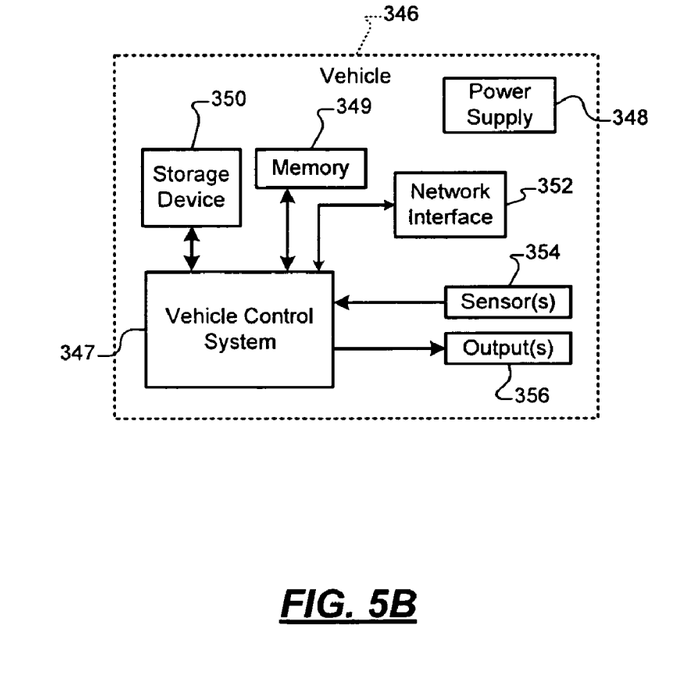
FIG. 5B is a functional block diagram of a vehicle control system.

Referring now to FIG. 5B, the teachings of the disclosure may be implemented in a storage device 350 of a vehicle 346. The vehicle 346 may include a vehicle control system 347, a power supply 348, memory 349, the storage device 350, and a network interface 352. If the network interface 352 includes a wireless local area network interface, an antenna (not shown) may be included. The vehicle control system 347 may be a powertrain control system, a body control system, an entertainment control system, an anti-lock braking system (ABS), a navigation system, a telematics system, a lane departure system, an adaptive cruise control system, etc.

The vehicle control system 347 may communicate with one or more sensors 354 and generate one or more output signals 356. The sensors 354 may include temperature sensors, acceleration sensors, pressure sensors, rotational sensors, airflow sensors, etc. The output signals 356 may control engine operating parameters, transmission operating parameters, suspension parameters, etc.

The power supply 348 provides power to the components of the vehicle 346. The vehicle control system 347 may store data in memory 349 and/or the storage device 350. Memory 349 may include random access memory (RAM) and/or nonvolatile memory such as flash memory, phase change memory, or multi-state memory, in which each memory cell has more than two states. The storage device 350 may include an optical storage drive, such as a DVD drive, and/or a hard disk drive (HDD). The vehicle control system 347 may communicate externally using the network interface 352.

Figure 5C:
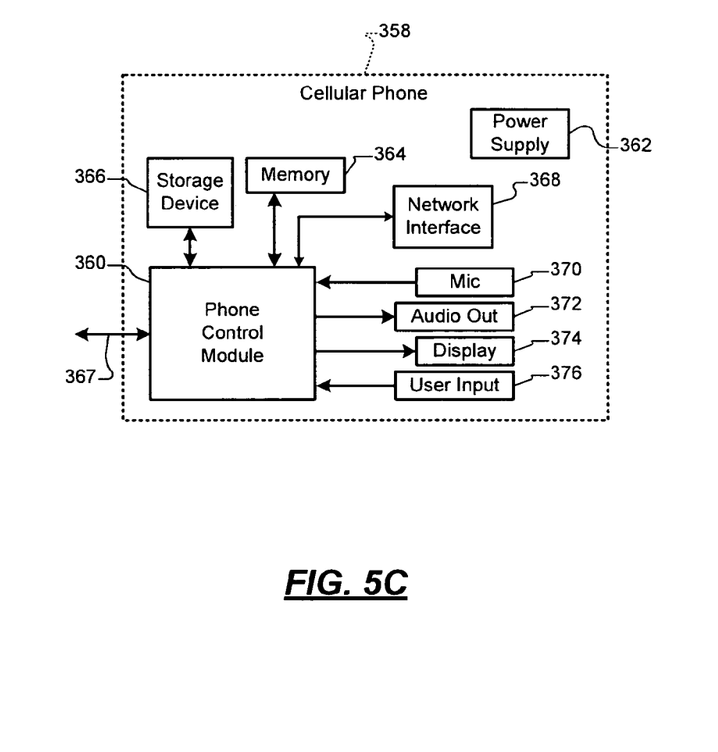
FIG. 5C is a functional block diagram of a cellular phone.

Referring now to FIG. 5C, the teachings of the disclosure can be implemented in a storage device 366 of a cellular phone 358. The cellular phone 358 includes a phone control module 360, a power supply 362, memory 364, the storage device 366, and a cellular network interface 367. The cellular phone 358 may include a network interface 368, a microphone 370, an audio output 372 such as a speaker and/or output jack, a display 374, and a user input device 376 such as a keypad and/or pointing device. If the network interface 368 includes a wireless local area network interface, an antenna (not shown) may be included.

The phone control module 360 may receive input signals from the cellular network interface 367, the network interface 368, the microphone 370, and/or the user input device 376. The phone control module 360 may process signals, including encoding, decoding, filtering, and/or formatting, and generate output signals. The output signals may be communicated to one or more of memory 364, the storage device 366, the cellular network interface 367, the network interface 368, and the audio output 372.

Memory 364 may include random access memory (RAM) and/or nonvolatile memory such as flash memory, phase change memory, or multi-state memory, in which each memory cell has more than two states. The storage device 366 may include an optical storage drive, such as a DVD drive, and/or a hard disk drive (HDD). The power supply 362 provides power to the components of the cellular phone 358.

Figure 5D:
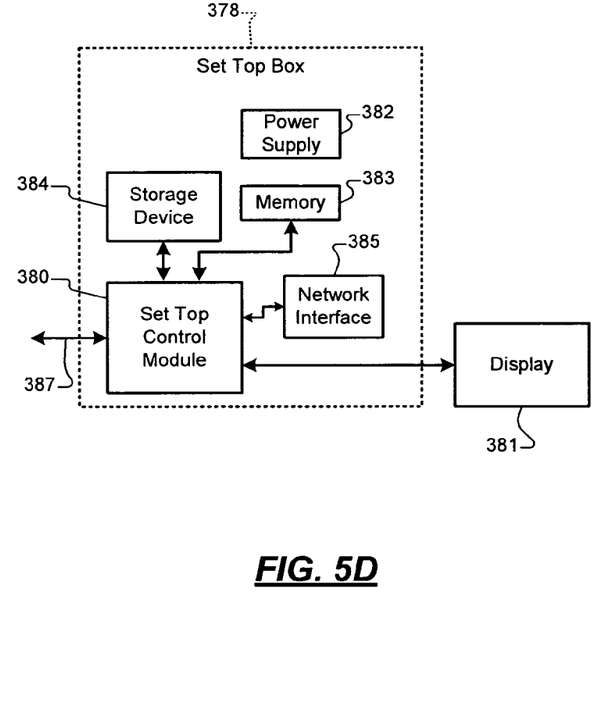
FIG. 5D is a functional block diagram of a set top box.

Referring now to FIG. 5D, the teachings of the disclosure can be implemented in a storage device 384 of a set top box 378. The set top box 378 includes a set top control module 380, a display 381, a power supply 382, memory 383, the storage device 384, and a network interface 385. If the network interface 385 includes a wireless local area network interface, an antenna (not shown) may be included.

The set top control module 380 may receive input signals from the network interface 385 and an external interface 387, which can send and receive data via cable, broadband Internet, and/or satellite. The set top control module 380 may process signals, including encoding, decoding, filtering, and/or formatting, and generate output signals. The output signals may include audio and/or video signals in standard and/or high definition formats. The output signals may be communicated to the network interface 385 and/or to the display 381. The display 381 may include a television, a projector, and/or a monitor.

The power supply 382 provides power to the components of the set top box 378. Memory 383 may include random access memory (RAM) and/or nonvolatile memory such as flash memory, phase change memory, or multi-state memory, in which each memory cell has more than two states. The storage device 384 may include an optical storage drive, such as a DVD drive, and/or a hard disk drive (HDD).

Figure 5E:
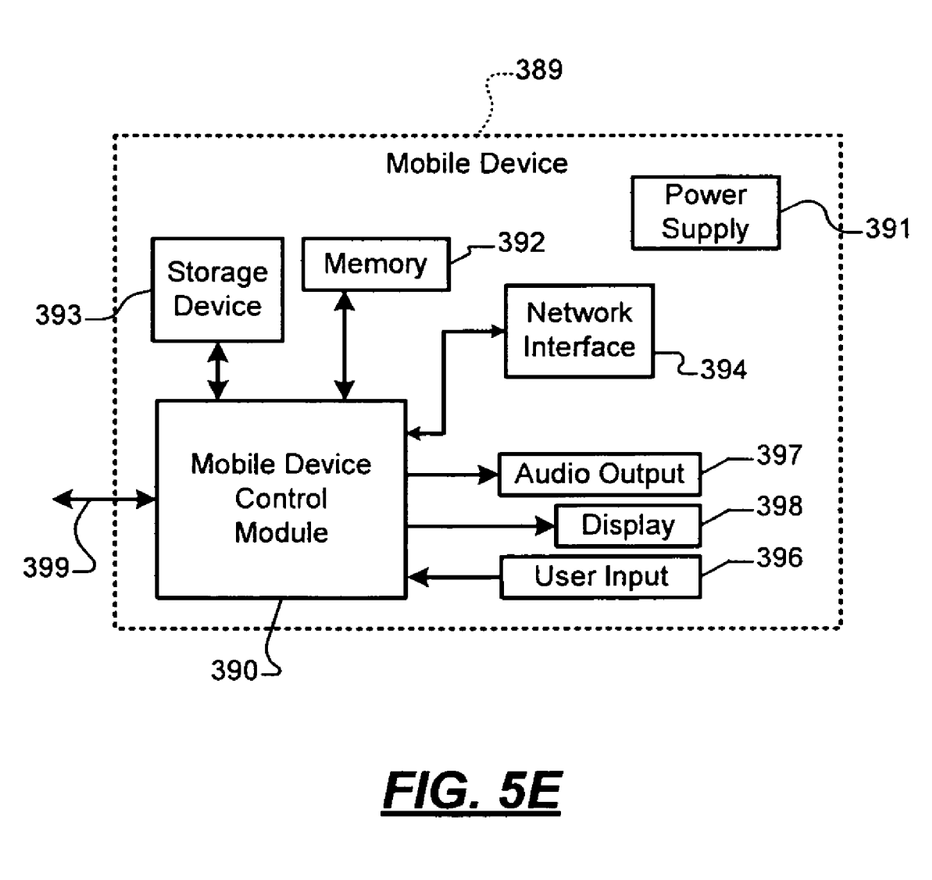
FIG. 5E is a functional block diagram of a mobile device.

Referring now to FIG. 5E, the teachings of the disclosure can be implemented in a storage device 393 of a mobile device 389. The mobile device 389 may include a mobile device control module 390, a power supply 391, memory 392, the storage device 393, a network interface 394, and an external interface 399. If the network interface 394 includes a wireless local area network interface, an antenna (not shown) may be included.

The mobile device control module 390 may receive input signals from the network interface 394 and/or the external interface 399. The external interface 399 may include USB, infrared, and/or Ethernet. The input signals may include compressed audio and/or video, and may be compliant with the MP3 format. Additionally, the mobile device control module 390 may receive input from a user input device 396 such as a keypad, touchpad, or individual buttons. The mobile device control module 390 may process input signals, including encoding, decoding, filtering, and/or formatting, and generate output signals.

The mobile device control module 390 may output audio signals to an audio output 397 and video signals to a display 398. The audio output 397 may include a speaker and/or an output jack. The display 398 may present a graphical user interface, which may include menus, icons, etc. The power supply 391 provides power to the components of the mobile device 389. Memory 392 may include random access memory (RAM) and/or nonvolatile memory such as flash memory, phase change memory, or multi-state memory, in which each memory cell has more than two states. The storage device 393 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for calibrating a magneto-resistive (MR) head, the system comprising:
  a biasing circuit that generates (i) a first current to bias a first head during a calibration mode and (ii) a calibrated current to bias the MR head during an operating mode; and
  a calibration module that calibrates the first current during the calibration mode by adjusting the first current using nonlinear steps to determine the calibrated current,
  wherein the first head is different than the MR head.

2. The system of claim 1, further comprising a head selection module that (i) connects the first head to the biasing circuit during the calibration mode and that (ii) disconnects the first head from the biasing circuit and connects the MR head to the biasing circuit during the operating mode.

3. The system of claim 2, wherein when the biasing circuit generates the calibrated current, the head selection module disconnects the first head from the biasing circuit and connects the MR head to the biasing circuit.

4. The system of claim 2, wherein the calibration module comprises:
  a first reference generator that generates a first reference voltage;
  a comparator that (i) compares the first reference voltage to a first voltage generated across the first head by the first current and (ii) generates a control signal based on the comparison of the first reference voltage to the first voltage; and
a counter module that generates non-sequential counts based on the control signal, wherein the nonlinear steps are based on the non-sequential counts.

5. The system of claim 4, wherein the first reference generator comprises:
a second reference generator that generates a second reference voltage, wherein the second reference voltage is substantially equal to a bias voltage rating of the MR head; and
an amplifier in communication with the MR head during the calibration mode, wherein the amplifier generates an output based on the second reference voltage and a second voltage across the MR head, wherein the second voltage is generated by a second current that is based on the output.

6. The system of claim 5, wherein the first reference generator further comprises a current mirror that communicates with (i) the MR head and (ii) a second head that matches the first head, wherein the current mirror mirrors the second current and generates a first reference current, wherein the first current generates the first reference voltage across the second head.

7. The system of claim 1, wherein the first head has a first bias voltage rating that is greater than a second bias voltage rating of the MR head, and wherein the first current generates a first voltage across the first head that is greater than or equal to the second bias voltage rating during the calibration mode.

8. A preamplifier circuit in a hard disk drive (HDD), the preamplifier circuit comprising the system of claim 1.

9. A method for calibrating a magneto-resistive (MR) head, the method comprising:
generating a first current to bias a first head during a calibration mode;
adjusting the first current using nonlinear steps to determine a calibrated current; and
generating the calibrated current to bias the MR head during an operating mode,
wherein the first head is different than the MR head.

10. The method of claim 9, further comprising:
connecting the first head to a biasing circuit during the calibration mode; and
disconnecting the first head from the biasing circuit and connecting the MR head to the biasing circuit during the operating mode.

11. The method of claim 10, further comprising disconnecting the first head from the biasing circuit and connecting the MR head to the biasing circuit when the biasing circuit generates the calibrated current.

12. The method of claim 10, further comprising:
generating a first reference voltage;
generating a control signal based on (i) the first reference voltage and (ii) a first voltage generated across the first head by the first current; and
generating non-sequential counts based on the control signal, wherein the nonlinear steps are based on the non-sequential counts.

13. The method of claim 12, further comprising:
generating a second reference voltage that is substantially equal to a bias voltage rating of the MR head; and
generating a second current that generates a second voltage across the MR head during the calibration mode, wherein the second current is based on the second reference voltage and the second voltage.

14. The method of claim 13, further comprising:
generating a first reference current by mirroring the second current; and
generating the first reference voltage across a second head based on the first reference current, wherein the second head matches the first head.

15. The method of claim 9, further comprising generating a first voltage across the first head that is greater than or equal to a bias voltage rating of the MR head during the calibration mode.

16. A system for calibrating a magneto-resistive (MR) head, the system comprising:
biasing means for generating (i) a first current to bias a first head during a calibration mode and (ii) a calibrated current to bias the MR head during an operating mode; and
calibration means for calibrating the first current during the calibration mode by adjusting the first current using nonlinear steps to determine the calibrated current,
wherein the first head is different than the MR head.

17. The system of claim 16, further comprising head selection means for (i) connecting the first head to the biasing means during the calibration mode and (ii) disconnecting the first head from the biasing means and connecting the MR head to the biasing means during the operating mode.

18. The system of claim 17, wherein when the biasing means generates the calibrated current, the head selection means (i) disconnects the first head from the biasing means and (ii) connects the MR head to the biasing means.

19. The system of claim 17, wherein the calibration means comprises:
first reference generating means for generating a first reference voltage;
comparing means for (i) comparing the first reference voltage to a first voltage generated across the first head by the first current and (ii) generating a control signal based on the comparison of the first reference voltage to the first voltage; and
counting means for generating non-sequential counts based on the control signal, wherein the nonlinear steps are based on the non-sequential counts.

20. The system of claim 19, wherein the first reference generating means comprises:
second reference generating means for generating a second reference voltage that is substantially equal to a bias voltage rating of the MR head; and
amplifying means in communication with the MR head during the calibration mode, the amplifying means for generating an output based on the second reference voltage and a second voltage across the MR head, wherein the second voltage is generated by a second current that is based on the output.

21. The system of claim 20, wherein the first reference generating means further comprises current mirroring means in communication with the MR head, the current mirroring means for (i) mirroring the second current and (ii) generating a first reference current, wherein the first reference current generates the first reference voltage across a second head that matches the first head.

22. The system of claim 16, wherein the first head has a first bias voltage rating that is greater than a second bias voltage rating of the MR head, and wherein the first current generates a first voltage across the first head that is greater than or equal to the second bias voltage rating during the calibration mode.

23. A preamplifier circuit in a hard disk drive (HDD), the preamplifier circuit comprising the system of claim 16.

* * * * *